United States Patent
Fuchs et al.

(10) Patent No.: US 6,457,442 B1
(45) Date of Patent: Oct. 1, 2002

(54) LIQUID-COOLED INTERNAL COMBUSTION ENGINE

(75) Inventors: Heinz Wolfgang Fuchs, Remscheid; Boris Besler, Karlsruhe; Ferdinand Herms, Nordhausen, all of (DE)

(73) Assignee: Deutz Akiengesellschaft, Cologne (DE)

( * ) Notice: Subject to any disclaimer, the term of this patent is extended or adjusted under 35 U.S.C. 154(b) by 0 days.

(21) Appl. No.: 09/715,912

(22) Filed: Nov. 17, 2000

(30) Foreign Application Priority Data

Nov. 17, 1999 (DE) ......................... 199 55 302

(51) Int. Cl.$^7$ ................................. F01P 3/00
(52) U.S. Cl. .................................... 123/41.29
(58) Field of Search ....................... 123/41.29

(56) References Cited

U.S. PATENT DOCUMENTS

| | | | | |
|---|---|---|---|---|
| 3,319,614 A | * | 5/1967 | Shanahan | 123/41.08 |
| 3,444,845 A | * | 5/1969 | Scheiterlein | 123/41.29 |
| 4,362,131 A | * | 12/1982 | Mason et al. | 123/41.29 |
| 4,565,175 A | * | 1/1986 | Kaye | 123/41.29 |
| 4,926,800 A | * | 5/1990 | Valev | 123/41.29 |
| 5,020,482 A | * | 6/1991 | Deutschmann | 123/41.29 |
| 5,201,285 A | * | 4/1993 | McTaggart | 123/41.29 |
| 5,215,044 A | * | 6/1993 | Banzhaf et al. | 123/41.29 |
| 5,415,147 A | * | 5/1995 | Nagle et al. | 123/41.29 |
| 5,910,099 A | * | 6/1999 | Jordan, Jr. et al. | 123/41.29 |
| 6,098,576 A | * | 8/2000 | Nowak, Jr. et al. | 123/41.29 |

FOREIGN PATENT DOCUMENTS

DE    198 10 726    9/1999

* cited by examiner

Primary Examiner—Noah P. Kamen
Assistant Examiner—Jason Benton
(74) Attorney, Agent, or Firm—Charles L. Schwab; Nexsen Pruet Jacobs & Pollard, LLC

(57) ABSTRACT

The coolant circuit downstream of the coolant pump 1 of an internal combustion engine is divided into a) an engine cooling loop (I) through the internal combustion engine (2) with a crankcase and a cylinder head, b) an exhaust loop (II) with an exhaust manifold (3) and a turbocharger (4) and c) a heat exchanger loop (III) with a charge heat exchanger (9) and a raw water heat exchanger (8)

in a parallel configuration. These loops are recombined upstream of the coolant pump (1).

7 Claims, 1 Drawing Sheet

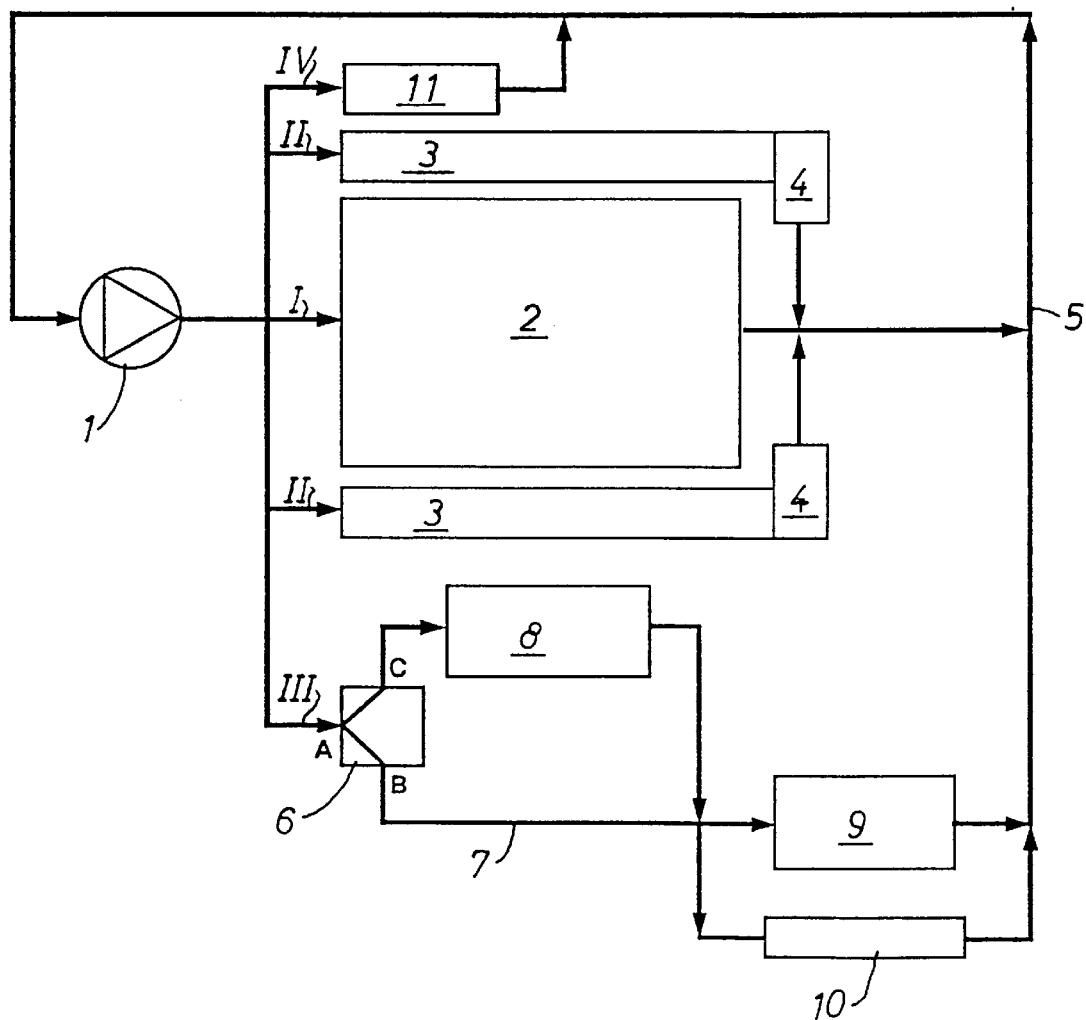

LIQUID-COOLED INTERNAL COMBUSTION ENGINE

TECHNICAL FIELD

This invention relates to a liquid-cooled internal combustion engine with a crankcase, at least one cylinder head, at least one exhaust manifold, at least one turbocharger, at least one charge heat exchanger and at least one raw water heat exchanger, which are connected into a coolant circuit together with a coolant pump.

BACKGROUND ART

German patent document DE 198 10 726 A1, entitled Exhaust Gas Duct Cooled with Water, published Sep. 16, 1999, A. Kschischo and M. Rapp, inventors, discloses an internal combustion engine which includes a charge heat exchanger and a raw water heat exchanger. The cooling system of this internal combustion engine is essentially constructed in such a way that coolant flows successively through the crankcase of the internal combustion engine together with the cylinder heads, the supercharger and then the exhaust manifolds. A raw water heat exchanger is connected to the exhaust manifolds on the discharge side and, in series with the exhaust manifolds, a charge heat exchanger is incorporated into the coolant circuit. As a whole, the coolant circuit is made as a series system, the principal stress in this document being laid on the design of the exhaust manifolds with respect to coolant guidance and assembly.

DISCLOSURE OF THE INVENTION

It is an object of the invention to furnish a liquid-cooled internal combustion that is optimized with respect to coolant stream guidance.

According to the invention, this object is achieved by virtue of the fact that the coolant circuit downstream of the coolant pump is divided into
 a) an engine cooling loop through the internal combustion engine with the crankcase and the cylinder head,
 b) an exhaust loop with the exhaust manifold and the turbocharger and
 c) a heat exchanger loop with the charge heat exchanger and the raw water heat exchanger
in parallel configuration, and these loops are recombined upstream of the coolant pump. This design lowers the net flow resistance of the coolant circuit relative to differently connected coolant circuits and thus reduces the danger of cavitation, among other things. Thus the coolant pump must convey the coolant against a lower differential pressure than in known coolant circuits, so that a lower net drive power is required. The invention takes its initial point of departure from a given engine cooling loop through the internal combustion engine with the crankcase and the cylinder head, and the maximum coolant quantity to be conveyed through these components is taken as a given quantity. On the basis of this quantity and the flow resistance of the components of the internal combustion engine through which the coolant flows, from inlet to discharge side, a certain differential pressure results, which in turn determines the mass flow rate of the coolant. The additional components to be cooled or, respectively, heat exchangers through which coolant is to flow, are combined into groups and, in further development of the invention, are designed in such a way that the differential pressure in these loops, namely the exhaust loop and the heat exchanger loop, is adjustable. This is accomplished by the components themselves or, if appropriate, by the respectively required tubing connections or by throttles, adjustable if appropriate, inserted into these tubing connections or the components. By virtue of this design, the differential pressure over the engine cooling loop, the exhaust loop and the heat exchanger loop comes out to the same value in each case. This insures that the necessary quantity of coolant flows through the individual loops.

In development of the invention, a coolant thermostat is inserted into the heat exchanger loop on the inlet side and controls a coolant flow through the raw water heat exchanger and a bypass around this heat exchanger. Further, the coolant stream is guided through the charge heat exchanger. By virtue of this design, a relatively large substream is led from the coolant thermostat through the raw water heat exchanger in accordance with the engine inlet temperature. There is no flow through the raw water heat exchanger during the engine warmup phase, so that the charge cooler also does not provide a cooling function. In this operating mode, the combustion air supplied to the engine is heated in the charge cooler by the coolant. In this way, the usual blue smoke of the engine in this operating mode, that is, cold start/low load, is markedly reduced or entirely avoided. When the engine is warmed up to operating temperature, a large part of the coolant of the heat exchanger, and thus cooled coolant, is supplied to the charge cooler. A powerful cooling action of the charge is achieved in this way. This guarantees a low charge temperature when the engine is in full-load operation. A further advantage of this design is that because only a substream of the total coolant stream flows through the coolant thermostat, a smaller mass-produced thermostat can be employed.

In development of the invention, a transmission oil heat exchanger is connected in parallel with the charge heat exchanger and a heating loop may be connected in parallel with the engine cooling loop, the exhaust loop and the heat exchanger loop. These features are included depending on the requirement.

In further development of the invention, the internal combustion engine is designed as a multicylinder V-type engine with two cylinder head rows and thus forms the engine cooling circuit. The exhaust loop in this design is divided into two identical loops connected in parallel. Naturally, the solution is also applicable for an in-line engine.

BRIEF DESCRIPTION OF THE DRAWINGS

The single drawing FIGURE is a schematic showing of an exemplary embodiment of the invention.

BEST MODE FOR CARRYING OUT THE INVENTION

The single FIGURE shows schematically one embodiment of the cooling system of this invention. From a coolant pump 1, the coolant, which is usually water in a liquid-cooled internal combustion engine, is conveyed in several substreams in distinct loops. The first of these is an engine cooling loop I through a compression-ignition internal combustion engine 2, which in the exemplary embodiment is designed as a multicylinder V-type engine with two cylinder head rows on a common crankcase. A second substream of the coolant conveyed by coolant pump 1 is lead into each of two exhaust loops II, each with an exhaust manifold 3 and a turbocharger 4 adjacent to the exhaust manifold 3. Engine cooling loop I and both exhaust loops II, are combined downstream of internal combustion engine 2 and connected to a common coolant header 5.

A third substream conveyed by the coolant pump 1 is led into a heat exchanger loop III. Inserted at the inlet of the heat exchanger loop III is a coolant thermostat 6 with an inlet A and two outlets B, C. Outlet B is held open by the coolant thermostat 6 when the coolant is cold, and this outlet is connected, via a bypass 7, in parallel with a raw water heat exchanger 8, which is connected to outlet C of the coolant thermostat 6. As the coolant becomes warmer in the operation of the internal combustion engine 2, it is led by the coolant thermostat 6 in a continuously transitional manner from outlet B to outlet C, so that increasing cooling of the coolant consequently takes place as a function of the operating temperature of the internal combustion engine 2.

Downstream of the raw water heat exchanger 8, the coolant stream flowing through this heat exchanger is combined with that of the bypass 7 and led into a charge heat exchanger 9 and a transmission oil heat exchanger 10 connected in parallel therewith. Downstream of the charge heat exchanger 9 and the transmission oil heat exchanger 10, the heat exchanger loop III is recombined and led into the coolant header 5. If necessary, a heating loop IV is provided in parallel with these three substreams, which heating loop leads a substream of the coolant through a heating heat exchanger 11. Downstream of the heating heat exchanger 11, this substream is likewise led into the coolant header 5. Coolant header 5, finally, is connected to the inlet of the coolant pump 1.

As a consequence of the flow resistance of the components through which a specified quantity of coolant is to flow, a differential pressure, which has a value of, for example, 2 bar, is established along the coolant guidance of the engine cooling loop I through the internal combustion engine 2 and the two cylinder head rows. This differential pressure determines the mass flow rate of the coolant and, for an existing internal combustion engine, it is regarded as given and not changeable, in particular not reducible. In order to guarantee a continuous flow of coolant through the exhaust loops II, the heat exchanger loop III and, if appropriate, the heating loop IV, the mass flow of coolant are adjusted to the specified pressure difference of 2 bar in each case. This is achieved through the design of the components themselves, through appropriate tubing connection or throttles, adjustable if appropriate, inserted into the components or the tubing connections. In the exemplary embodiment of the invention coolant flow rate of approximately 475 liter/minute is required through engine cooling loop I. The coolant flow rate through each of the exhaust loops II is approximately 100 liter/minute. Coolant flow through the heat exchanger loop III is approximately 130 liter/minute. To these is added, if appropriate, the out the heating loop IV, the total coolant flow rate is approximately 705 liter/min.

What is claimed is:

1. A liquid-cooled internal combustion engine having a crankcase, at least one cylinder head, an exhaust manifold, a turbocharger, a charge heat exchanger, and a raw water heat exchanger, and further comprising:

a single coolant pump (1) and
   a coolant circuit connected in downstream relation to said coolant pump and divided into
   a) an engine cooling loop (I) through said internal combustion engine (2) including said crankcase and said cylinder head,
   b) an exhaust loop (II) including said exhaust manifold (3) and said turbocharger (4) and
   c) a heat exchanger loop (III) including said raw water heat exchanger (8) and said charge air heat exchanger (9) connected downstream of and in series with saw raw water heat exchanger,
   said loops being connected in parallel and recombined upstream of said coolant pump (1).

2. The liquid-cooled internal combustion engine of claim 1 wherein the mass flow rate of coolant through said exhaust loop (II) and said heat exchanger loop (III) is adjustable.

3. The liquid-cooled internal combustion engine of claim 2 wherein the differential pressure is the same across said engine cooling loop (I), said exhaust loop (II) and said heat exchanger loop (III).

4. The liquid-cooled internal combustion engine of claim 1 wherein said heat exchanger loop III includes a coolant thermostat (6) and a bypass (7) around said raw water heat exchanger (8), said thermostat (6) controlling coolant flow through said raw water heat exchanger (8).

5. The liquid-cooled internal combustion engine of claim 4 and further comprising a transmission oil heat exchanger (10) connected in parallel with said charge air heat exchanger (9).

6. The liquid-cooled internal combustion engine of claim 1 and further comprising a heating loop (IV) connected in parallel with said engine cooling loop (I), said exhaust loop (II) and said heat exchanger loop (III).

7. The liquid-cooled internal combustion engine of claim 1 wherein said internal combustion engine (I) is a multicylinder V-type engine with two cylinder head rows.

* * * * *